Figure 1:
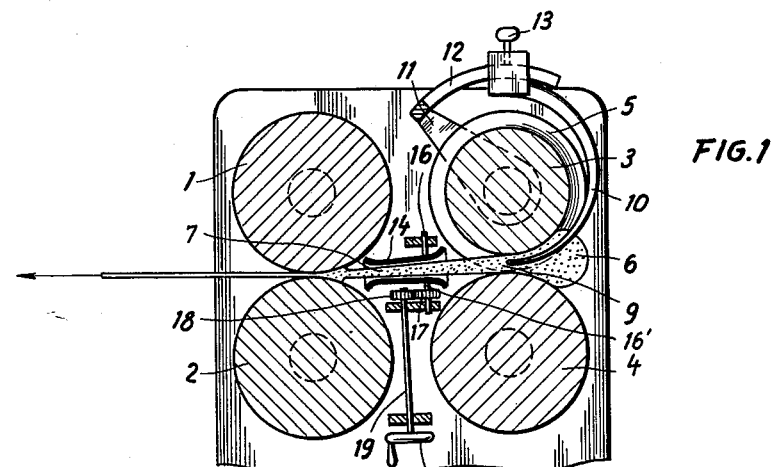

Aug. 25, 1964   E. KÜSTERS   3,145,418
APPARATUS FOR DRAWING OUT FOILS FROM PLASTIC MATERIAL
Filed March 17, 1961

*Inventor*
*Eduard Küsters*
By his attorneys
*Howson and Howson*

3,145,418
APPARATUS FOR DRAWING OUT FOILS FROM PLASTIC MATERIAL
Eduard Küsters, Krefeld, Germany, assignor to Eduard Küsters Maschinenfabrik, Krefeld, Germany
Filed Mar. 17, 1961, Ser. No. 141,926
Claims priority, application, Germany, Nov. 12, 1960,
K 42,137
8 Claims. (Cl. 18—9)

The invention relates to apparatus for drawing foils from plastic substance, for example a plastic substance based on polyvinyl chloride, but without being confined to this synthetic substance, in which the material arriving from a working-up machine consisting of a mixing calender, is conducted between drawing rollers.

In apparatus for drawing foils, so-called foil drawing calenders, the aim is to produce foils which are uniform in thickness over their entire width and length. For this purpose two or more pairs of rollers are arranged one behind the other because, for producing a uniform foil thickness, especially in the direction of the length, one pair of drawing rollers is not sufficient. As a rule the pairs of drawing rollers run at different speeds.

For drawing foils the drawing rollers are set to a pass, that is a limit is set for the size of the gap between the outer walls of the rollers which gap corresponds to the thickness of the foil it is desired to produce, whereby the material being rolled exerts a pressure on the surfaces of the drawing rollers.

The known foil drawing machines have expensive rollers of relatively large diameter and drawing and pressure systems which are of large dimensions and require driving power which is out of all proportion to the work actually to be performed, namely to draw out a plastic material into a foil. These large dimensions have been necessary to deal with the high pressures occurring during the drawing of the foils.

The invention is based on the knowledge that this large dimensioning combined with high power consumption can be avoided if pressure conditions are established which correspond to the actual pressure to be exerted for flattening out the plasticized material.

Taking advantage of this knowledge, it was found that the pressure exerted by the plasticized material on the drawing rollers is dependent to a very considerable degree upon the extent to which the gap between the rollers is filled. The proportion of the pressure caused by the volume of material filling the gap in relation to the total pressure becomes greater with larger roller diameters and correspondingly lesser with smaller nip or intake angles between the rollers. This last mentioned circumstance results in the fact that with the conventional large roller diameters fluctuations in the volume filling the roller gap act chiefly on amount of pressure and the uniformity of the thickness in the longitudinal direction of the drawn material.

If, for example, a foil 0.5 mm. in thickness is to be drawn, the drawing rollers in the case of the known foil drawing machines are set to a gap clearance of 0.5 mm. If the volume of material filling the gap drops to a value which is below that necessary for forming a foil having a thickness of 0.5 mm., the pressure in the roller gap drops to zero. If on the other hand the volume of material increases to a quantity exceeding that which is necessary for drawing a foil 0.5 mm. in thickness, the roller pressure increases to a maximum value, which, once reached, no longer allows any further increase of the filling volume to cause an increase in pressure. The maximum pressure is far higher than that required for forming a foil 0.5 mm. in thickness, if the volume of material filling the roller gap corresponds only to the quantity necessary for producing such a foil and which is called the "theoretical value."

Hitherto the volume of material filling the first roller gap has been approximately equal to or in excess of the maximum value, which results in high roller pressures combined with the necessity of employing rollers of large diameter which, due to the changing conditions described, in turn result in greater pressures being produced. Having to take into consideration the feed of the material to the drawing rollers this method of operation was required.

According to the invention, the volume of material filling the roller gap on the intake side during the drawing operation is maintained as far as possible at the theoretical value as well as being distributed as uniformly as possible across the intake width with simultaneous feed over the entire intake width, and drawing rollers are employed having a diameter which actually or nearly produce an obtuse angle at the nip or intake.

As a result it is possible to work with a roller pressure which almost corresponds to the pressure necessary for thinning or flattening out the plasticized material, because in exerting the pressure merely the residual fluctuations within the theoretical value need be taken into consideration and the power required is correspondingly low. The heavy pressures caused by the large roller diameters are avoided. Therefore the apparatus can be of very light and cheap construction and the running costs considerably reduced. Moreover the drawn product is also better in that foils are obtained which are more uniform, that is of absolutely uniform thickness. The power required for driving the rollers is, for example, only a fraction of the power which has been hitherto necessary.

According to the invention, the material is preferably fed between the drawing rollers over their entire width in the form of separate strings of uniform cross-section. The feeding of the individual strings not only presents the advantage of ensuring the feed of accurately measured quantities but also the further advantage that the radiation of heat is reduced and above all is made uniform over the entire intake width, so that the state of the material running into the nip of the drawing rollers is more uniform which fact has a favourable effect on the drawing of uniform thicknesses. Hitherto differences in the state of the material to be drawn could not be avoided.

The spacing of the individual strings introduced into the nip of the drawing rollers can be adjusted according to the uniform quantitative distribution of material over the entire intake width which it is desired to obtain. This adjustment enables any variations in the string cross-sections to be compensated so that they do not affect the uniformity of the quantative distribution intake on the draw-in width.

A further adjustment of the quantity can be effected according to the invention by regulating the cross-sectional size of the strings either individually or jointly. This mode of regulation is advantageous when the same apparatus is to be used for drawing foils of different thicknesses.

It is also possible to regulate the quantity by dividing the material passing out from the working-up machine into adjacent strips by cutting blades, for example in the form of rotary cutting discs, and if necessary trimming these strips, when the spacing of the strips running or drawn into the drawing rollers can be adjusted.

An apparatus for carrying out the method is equipped with drawing rollers of relatively small diameter which form an obtuse nip or intake angle or approximately such an angle, combined with a uniform quantity feed on the intake width and uniform feeding on the entire intake width as well as maintenance of the volume filling the lead-in or intake gap the same as the theoretical value for the thickness of the foil to be drawn. The diameter of the drawing rollers, for example for a working width of 2,000 mm. is about 350 mm. or less, excluding small deviations on the higher side. For wider working widths a roller diameter can be chosen which is determined by the ratio between the working width and the diameter. It is important for the invention that the intake angle at the nip of the rollers be as obtuse as possible.

To operate the apparatus with simultaneous feed of strings having the same cross-section on the entire width of the drawing rollers, a set of rollers, the outer surfaces of which are in direct contact with each other and with the material passing therebetween and at least one of which surfaces is provided with peripheral grooves or channels, is arranged in front of the drawing rollers. The material delivered in calendered state from a working-up machine or a working-up machine combined with a mixer, runs out of this first set of rollers into the drawing rollers in the form of strings or cords. A suitable cross-section for these strings or cords is, for example, 36 mm.².

Guide elements may be provided for the strings or cords. These guide elements can be adjusted so that the distance between neighbouring strings or cords can be regulated on the side adjacent the drawing rollers.

The passage cross-sections of the peripheral grooves or channels can be adjustable.

For this purpose pin-like regulating elements can be introduced more or less deeply into the individual peripheral grooves or channels at the point where the rollers are in contact.

The regulating pins are preferably of curved shape tapering in cross-section towards their end to be inserted in a groove or channel and can swing concentrically or substantially concentrically to the periphery of one of the rollers.

They are adjustable not only jointly but individually so that errors in quantity due to any inaccuracies in the individual grooves or channels can be compensated in addition to the quantity as a whole being adjustable.

The regulating pins are preferably made from synthetic substance such as a fluorine synthetic substance, that is a product of polymerization from tetrafluoroethylene to which the plasticized foil substance does not adhere.

It is evident that the apparatus for carrying out the method can also be provided with heating arrangements if necessary.

Figure 2:
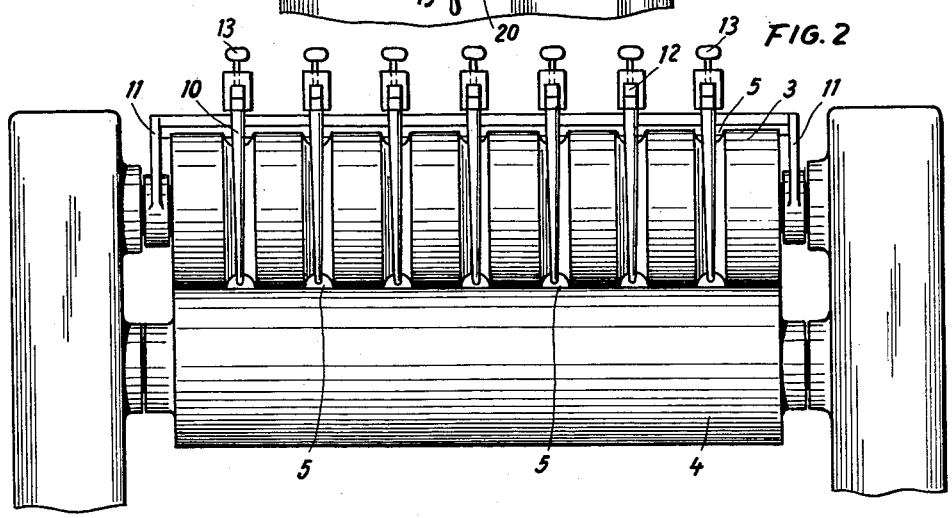
Figure 3:
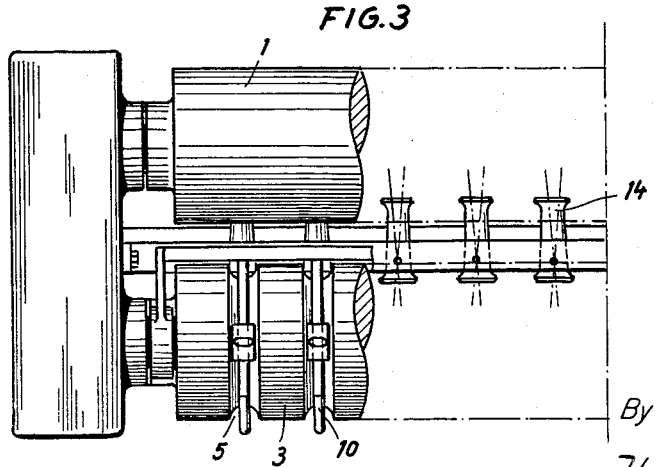

An embodiment for carrying out the method according to the invention is illustrated diagrammatically by way of example in the accompanying drawing, in which FIG. 1 shows such an apparatus in cross-section;

FIG. 2 is a longitudinal section of a set of rollers forming the strings of material, and FIG. 3 is a part top plan view of the apparatus shown in FIG. 2.

An example of an apparatus operating in the horizontal is illustrated. However, it is evident that a similar arrangement operating in the vertical or at an incline is possible.

The example illustrated is equipped with one set of drawing rollers. However several sets of drawing rollers might be provided, although in the case of the subject-matter of the application, one set of drawing rollers is as a rule sufficient.

The drawing rollers are designated by 1 and 2. They are of small diameter so that they form an obtuse intake angle when a line is drawn from the longitudinal axis of each roller toward the intake nip and angled forty-five degrees from the vertical, and each such line is connected with a line perpendicular thereto, so that the last two lines join the intake nip at a vertex forming the desired obtuse angle. In the case of the rollers hitherto employed it is an acute angle.

A set of rollers 3 and 4 is coordinated to the drawing rollers 1 and 2. The two rollers 3 and 4 are in direct contact with each other and with the material passing therebetween. The roller 3 is provided with peripheral grooves 5 so that the material 6 passing out between these rollers 3 and 4 is in the form of strings 7. A set of heated rollers may also be arranged in front of the rollers 3 and 4 but is not shown in the drawing. The rollers 3 and 4 can also be heated. The rollers 3 and 4 rotate more slowly than the rollers 1 and 2. 9 designates the quantity of material located in the nip or gap between the rollers 3 and 4 on the intake side.

Regulating pins 10 can be inserted more or less deeply into the peripheral grooves 5 for regulating the string cross-section to be formed by the grooves 5. These regulating pins are of curved shape and taper conically towards the end to be introduced into the grooves. They are made from fluorine synthetic material and fitted on a frame or rod 11 capable of swinging about the axis of the roller 3. They are mounted on curved members 12 whose radial centre lies in the axis of the roller 3. The pins 10 can be shifted separately on these curved members 12 and at the same time be swung about the axis of the roller 3. A screw 13 can serve as means for fixing the pins in their adjusted position on the curved members 12.

Special guides 14, possibly provided with means for heating and for example in the form of sleeve-like bodies of funnels with rounded inlet and outlet, can be provided for the strings of material running from the rollers 3, 4 to the drawing rollers 1 and 2. These guides are arranged to swivel separately in the intake plane about their ends adjacent the rollers 3, 4 and can be fixed in position so that the spacing of the individual strings of material can be adjusted.

For this purpose, each of the guides 14 can be mounted on pins 16, 16' capable of swinging about their common axis, the pin 16' being provided with a pinion 17. This pinion 17 meshes with a pinion 18 on the shaft 19 which also carries a hand crank 20. By turning this hand crank 20 the guide 14 is swung in the intake plane.

The quantity of material fed between the drawing rollers is uniformly distributed over the entire intake width and corresponds to the theoretical quantity for drawing the actual foil to be produced.

I claim:

1. Apparatus for drawing foils from plastic material comprising draw rollers with an intake nip between them and an obtuse angle at said nip, and rollers directly engaging each other mounted in front of the draw rollers and having means to effect quantitatively uniform feed of the material across the working width of the draw rollers, simultaneously feed said material between said draw rollers and to maintain a uniform volume of material filling the intake nip during drawing, said means including peripheral grooves spaced along the length of at least one of said front-mounted rollers, in combination with guides comprising sleeve-like bodies to feed material to the draw rollers in individual strings, and mounting means to swing the guides about their ends adjacent the front-mounted rollers in the intake plane, and means for fixing the guides in any position of swing.

2. The apparatus of claim 1 in which a series of pin-shaped material regulating elements are mounted, one each, in the peripheral grooves so as to terminate deeply therein at the point where the front mounted rollers engage each other.

3. The apparatus of claim 2 in which the pin shaped material regulating elements are curved and taper conically in cross-section toward that end of each said element which terminates in its respective groove.

4. The apparatus of claim 3 in which the pin shaped material regulating elements are individually adjustable.

5. The apparatus of claim 3 in which the pin shaped material regulating elements are collectively adjustable.

6. Apparatus according to claim 3, wherein the regulating pins are made of plastic substance selected from the group including the polymerisation products of tetrafluoroethylene, which products permit the plastic substances being processed to contact them without adhering to same.

7. Apparatus for drawing foils from synthetic materials comprising draw rollers having an intake nip between them, a fixed working width, and a diameter such that planes tangent to each roller containing a line parallel to the roller axes, which is equidistant from the peripheries of the rollers and situated a distance of at least ⅓ of the radius of said rollers from a plane tangent to both rollers on their intake side include an angle of more than 90° but less than 180°, and planes joining the roller axes with said line also include an angle of more than 90° but less than 180°, in combination with means for filling said intake nip along the working width of said draw rollers with a substantially even distribution of material across said width said means including guides comprising sleeve-like bodies for feeding material to the draw rollers and for limiting the amount of material being fed; whereby the wedge of material formed at the intake nip does not extend toward said intake side beyond the line positioned a distance ⅓ of the radius of said rollers from the plane tangent to both said rollers on their intake side.

8. The apparatus of claim 7 including rollers in contact with each other and mounted in front of the draw rollers, peripheral grooves being spaced along the length of at least one of these front-mounted rollers.

References Cited in the file of this patent

UNITED STATES PATENTS

| | | |
|---|---|---|
| 1,178,875 | Rios | Apr. 11, 1916 |
| 1,574,682 | Null | Feb. 23, 1926 |
| 1,743,302 | Allen | Jan. 14, 1930 |
| 1,756,328 | Andelin | Apr. 29, 1930 |
| 2,346,765 | Kratz | Apr. 18, 1944 |
| 2,712,154 | Lindquist | July 5, 1955 |
| 2,758,336 | Franssen | Aug. 14, 1956 |
| 2,908,042 | Synder | Oct. 13, 1959 |
| 2,922,223 | Boughton | Jan. 26, 1960 |
| 3,020,584 | Brakeley | Feb. 13, 1962 |

FOREIGN PATENTS

| | | |
|---|---|---|
| 458,350 | Germany | Apr. 10, 1928 |